United States Patent
Yamada et al.

(10) Patent No.: US 10,549,766 B2
(45) Date of Patent: Feb. 4, 2020

(54) RAILCAR INCLUDING CAR-BODY TILTING SYSTEM AND TRAIN SET

(71) Applicant: KAWASAKI JUKOGYO KABUSHIKI KAISHA, Kobe-shi, Hyogo (JP)

(72) Inventors: Tadashi Yamada, Kobe (JP); Yuta Yoshimatsu, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 122 days.

(21) Appl. No.: 15/766,974

(22) PCT Filed: Sep. 29, 2016

(86) PCT No.: PCT/JP2016/004393
§ 371 (c)(1),
(2) Date: Apr. 9, 2018

(87) PCT Pub. No.: WO2017/061087
PCT Pub. Date: Apr. 13, 2017

(65) Prior Publication Data
US 2018/0297616 A1 Oct. 18, 2018

(30) Foreign Application Priority Data
Oct. 7, 2015 (JP) ................................. 2015-199329

(51) Int. Cl.
*B61F 5/24* (2006.01)
*B61F 5/10* (2006.01)
(52) U.S. Cl.
CPC . *B61F 5/24* (2013.01); *B61F 5/10* (2013.01)
(58) Field of Classification Search
CPC ...... B61F 5/10; B61F 5/12; B61F 5/14; B61F 5/16; B61F 5/18; B61F 5/20; B61F 5/22; B61F 5/24; B61F 5/245
See application file for complete search history.

(56) References Cited

U.S. PATENT DOCUMENTS 5,255,611 A * 10/1993 Schneider ................. B61F 5/24
105/199.2
5,311,821 A * 5/1994 Lang .......................... B61F 5/06
105/199.2
(Continued)

FOREIGN PATENT DOCUMENTS

JP          5513175 B2      6/2014

OTHER PUBLICATIONS

Dec. 27, 2016 Search Report issued in International Patent Application No. PCT/JP2016/004393.

*Primary Examiner* — Jason C Smith
(74) *Attorney, Agent, or Firm* — Oliff PLC (57) ABSTRACT

A main tank storing pressurized air supplied to a pair of air springs; an air supply passage through which the pressurized air flows between the main tank and each of the pair of air springs; a plurality of compressors configured to supply the pressurized air to the main tank; an air discharge passage which is connected to the pair of air springs and through which discharged pressurized air discharged from the air springs flows; and an exhaust tank connected to the air discharge passage and storing the discharged pressurized air discharged from the air springs, the plurality of compressors including at least one first compressor configured to pressurize air introduced from an atmosphere and at least one second compressor configured to operate auxiliarily for an operation of the first compressor and pressurize the discharged pressurized air introduced from the exhaust tank.

6 Claims, 5 Drawing Sheets

(56) References Cited

U.S. PATENT DOCUMENTS

| | | | | |
|---|---|---|---|---|
| 5,560,589 | A | * | 10/1996 | Gran ................. B60G 9/022 105/199.2 |
| 2012/0118194 | A1 | * | 5/2012 | Schneider ............ B61F 5/24 105/171 |
| 2012/0227617 | A1 | * | 9/2012 | Schneider .......... B60G 99/002 105/199.2 |
| 2013/0158754 | A1 | * | 6/2013 | Gotou ................. B61F 5/22 701/19 |
| 2018/0297616 | A1 | * | 10/2018 | Yamada ................ B61F 5/10 |

* cited by examiner

RAILCAR INCLUDING CAR-BODY TILTING SYSTEM AND TRAIN SET

TECHNICAL FIELD

The present invention relates to a railcar including a car-body tilting system and a train set.

BACKGROUND ART

Proposed is a car-body tilting system capable of tilting the posture of a carbody with respect to a bogie when a railcar travels through a curved line. As such car-body tilting mechanism of the railcar, there is an air spring type car-body tilting mechanism configured such that air springs are provided between the bogie and the carbody.

Generally, the air springs of the car-body tilting system are connected to a main tank (main reservoir) capable of storing compressed air (hereinafter referred to as "pressurized air") supplied from a compressor mounted on the railcar, the compressor being provided as a drive power source for a brake of a car, a car door, and the like. When the railcar travels through a curved section, the air spring at an outer rail side and the main tank communicate with each other, and the pressurized air is introduced to the air spring at the outer rail side. When the railcar finishes traveling through the curved section, the communication between the air spring at the outer rail side and the main tank is cut off, and the compressed air in the air spring at the outer rail side is released to the atmosphere (hereinafter, the compressed air discharged from the air spring is referred to as "discharged pressurized air"). When a traveling line includes a large number of curved sections, supply and discharge of air to and from the left and right air springs are frequently performed. As a result, the pressure of the pressurized air in the main tank lowers, and this deteriorates operation responsiveness of the car-body tilting system.

To prevent such deterioration of the operation responsiveness of the car-body tilting system, proposed is a configuration in which: the discharged pressurized air discharged from the air springs is stored in an exhaust tank; and the discharged pressurized air is refluxed to the main tank (see PTL 1).

CITATION LIST

Patent Literature

PTL 1: Japanese Patent No. 5513175

SUMMARY OF INVENTION

Technical Problem

The pressurized air in the main tank is used for not only a carbody tilting operation but also other operations such as the operation of an air brake and the operation of a horn. In the other operations, the air used is released to the atmosphere. Therefore, even when the pressurized air used in the carbody tilting operation is refluxed to the main tank, the internal pressure of the main tank may lower.

In the above proposal, when the internal pressure of the main tank lowers by the other operations during the carbody tilting operation performed by introducing the discharged pressurized air from the exhaust tank to the compressor, it is necessary to perform switching such that the atmosphere can be introduced from the compressor to the main tank. More specifically, in the above proposal, an output portion of a three-way switching valve is connected to an upstream side of the compressor. Further, one of two input portions of the three-way switching valve is connected to the exhaust tank, and the other input portion is connected to an atmosphere introducing portion. In the above proposal, due to such configuration, the discharged pressurized air cannot be used during the introduction of the atmosphere, and this deteriorates efficiency.

An object of the present invention is to provide a railcar and a train set, each capable of efficiently supplying discharged pressurized air even when internal pressure of a main tank lowers.

Solution to Problem

A railcar according to one aspect of the present invention is a railcar including a car-body tilting system configured to tilt a carbody by supplying pressurized air to at least one of a pair of air springs provided between the carbody and a bogie frame so as to be located at both respective car width direction sides of the railcar, the car-body tilting system including: a main tank storing the pressurized air supplied to the pair of air springs; an air supply passage through which the pressurized air flows between the main tank and each of the pair of air springs; a plurality of compressors configured to supply the pressurized air to the main tank; an air discharge passage which is connected to the pair of air springs and through which discharged pressurized air discharged from the air springs flows; and an exhaust tank connected to the air discharge passage and storing the discharged pressurized air discharged from the air springs, the plurality of compressors including at least one first compressor configured to pressurize air introduced from an atmosphere and at least one second compressor configured to operate auxiliarily for an operation of the first compressor and pressurize the discharged pressurized air introduced from the exhaust tank.

According to the above configuration, the second compressor configured to introduce the discharged pressurized air is provided separately from the first compressor configured to introduce the atmosphere, and in a section where a carbody tilting operation needs to be continuously performed, the second compressor operates auxiliarily. Therefore, even when the second compressor is operating, the first compressor can independently introduce the atmosphere. On this account, even when the internal pressure of the main tank lowers, it is unnecessary to stop the operation of the second compressor, and a highly efficient state can be maintained.

The above object, other objects, features, and advantages of the present invention will be made clear by the following detailed explanation of preferred embodiments with reference to the attached drawings.

Advantageous Effects of Invention

According to the present invention, in the railcar or the train set, the discharged pressurized air can be efficiently supplied even when the internal pressure of the main tank lowers.

DESCRIPTION OF EMBODIMENTS

Hereinafter, embodiments will be explained in reference to the drawings. In the following explanations, a direction in which a carbody extends along a traveling direction of a railcar is defined as a car longitudinal direction, and a direction perpendicular to the traveling direction of the railcar is defined as a car width direction.

Embodiment 1

Figure 1:
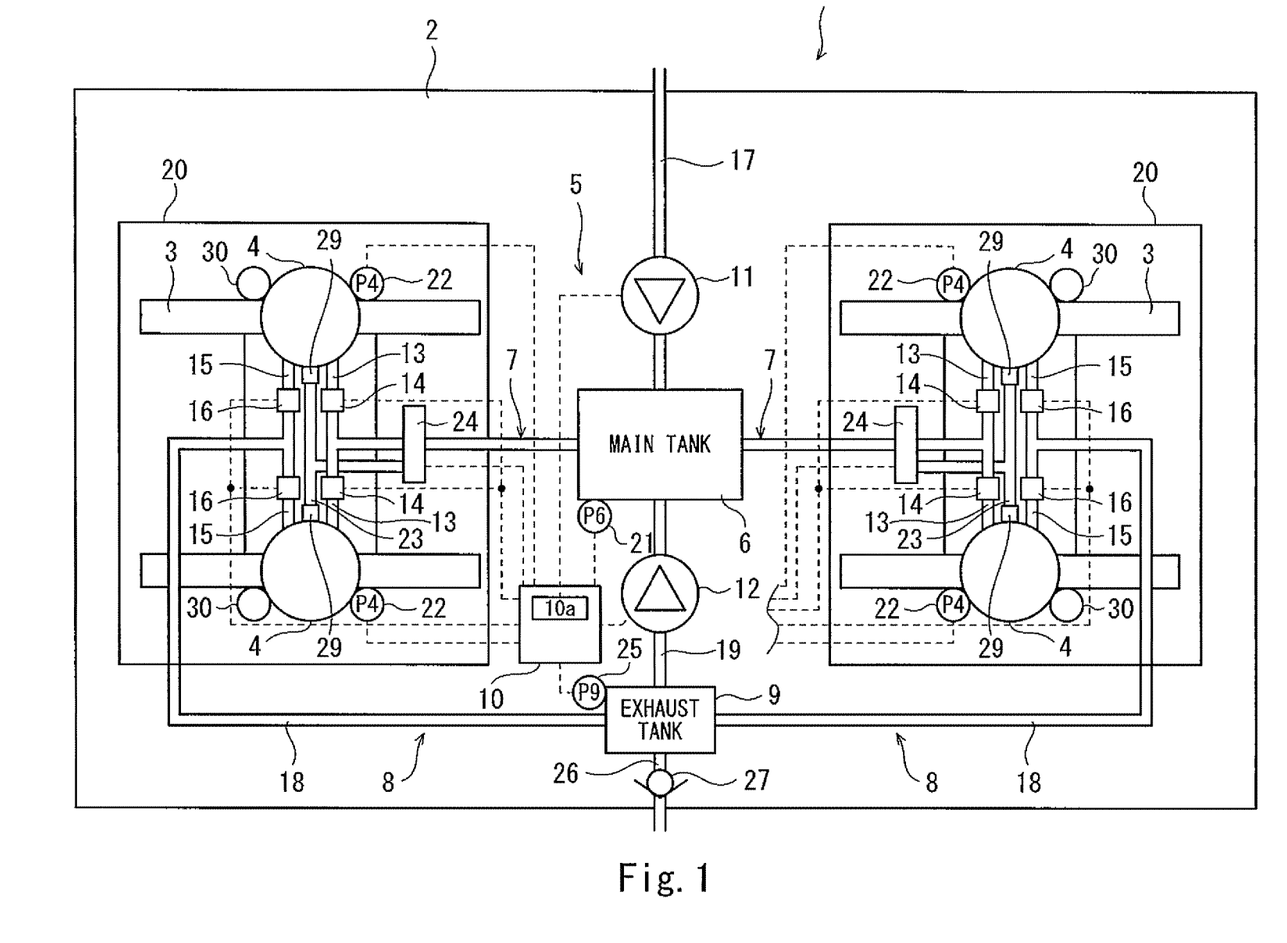
FIG. 1 is a plan view showing a schematic structure of a railcar in Embodiment 1.

FIG. 1 is a plan view showing a schematic structure of a railcar in Embodiment 1. As shown in FIG. 1, a railcar 1 in the present embodiment includes: a carbody 2 on which passengers get; and a bogie frame 3 supporting wheels (not shown). A pair of air springs 4 are provided between the carbody 2 and the bogie frame 3 so as to be located at both respective car width direction sides. In the railcar 1, two bogie frames 3 are provided for one carbody 2 so as to be lined up in the car longitudinal direction, and a pair of air springs 4 are provided for one bogie frame 3. As each of the air springs 4, a known component such as a diaphragm type air spring is adopted.

The railcar 1 includes a car-body tilting system capable of tilting the posture of the carbody 2 with respect to the bogie frames 3 when the railcar 1 travels through a curved line. A car-body tilting system 5 includes: a main tank 6 storing air (pressurized air) supplied to two pairs of air springs 4; air supply passages 7 through which the pressurized air flows between the main tank 6 and each of the air springs 4; and two tilting mechanisms 20 each configured to tilt the posture of the carbody 2 with respect to the corresponding bogie frame 3 using the pair of air springs 4 corresponding to the bogie frame 3.

The air supply passage 7 includes, as components of the tilting mechanism 20, a pair of air supply passages 13 which extend so as to be connected to the respective air springs 4 and through which the pressurized air is supplied to the respective air springs 4. Air supply adjusting valves 14 are provided on the respective air supply passages 13. Each of the air supply adjusting valves 14 adjusts the flow rate of the pressurized air supplied to the corresponding air spring 4. The air supply passage 7 is further provided with a pair of normal-time air supply passages 23 which are provided parallel to the pair of air supply passages 13 and on which the air supply adjusting valves 14 are not provided. A switching valve 24 is provided on the air supply passage 7 so as to be located between the main tank 6 and the pair of air supply passages 13 and between the main tank 6 and the pair of normal-time air supply passages 23. For forming a passage through which the pressurized air in the main tank 6 flows, the switching valve 24 is switched to cause the main tank 6 to communicate with the pair of air supply passages 13 or the pair of normal-time air supply passages 23.

Air discharge passages 8 through which air (discharged pressurized air) discharged from the air springs 4 flows are connected to the respective pairs of air springs 4. An exhaust tank 9 storing the discharged pressurized air discharged from the air springs 4 is connected to the air discharge passages 8. Each of the air discharge passages 8 includes: a pair of exhaust passages 15 which extend so as to be connected to the respective air springs 4 and cause the discharged pressurized air discharged from the air springs 4 to be combined in the air discharge passage 8; a reflux passage 18 through which the combined discharged pressurized air is introduced to the exhaust tank 9; and a below-described discharged pressurized air introducing passage 19. Air discharge adjusting valves 16 are provided on the respective exhaust passages 15. Each of the air discharge adjusting valves 16 adjusts the flow rate of the discharged pressurized air discharged from the corresponding air spring 4.

A plurality of compressors 11 and 12 are connected to the main tank 6. The compressors 11 and 12 supply the pressurized air to the main tank 6. The plurality of compressors 11 and 12 include a first compressor 11 configured to pressurize air introduced from the atmosphere and a second compressor 12 configured to pressurize the discharged pressurized air introduced from the exhaust tank 9.

The first compressor 11 is provided on an atmosphere introducing passage 17. The atmosphere introducing passage 17 connects the main tank 6 to an outside and is configured to be able to introduce the atmosphere to the main tank 6. The second compressor 12 is provided on the air discharge passage 8. The discharged pressurized air introducing passage 19 connects the exhaust tank 9 to the second compressor 12 and is configured to introduce the discharged pressurized air to the main tank 6 through the second compressor 12.

In the present embodiment, the two bogie frames 3 are lined up in the car longitudinal direction, and the tilting mechanisms 20 are provided for the respective bogie frames 3. One second compressor 12 and one exhaust tank 9 are provided for one car. In the example of FIG. 1, the reflux passages 18 are provided such that the discharged pressurized air discharged from one of the tilting mechanisms 20 and the discharged pressurized air discharged from the other tilting mechanism 20 are introduced to the exhaust tank 9. Instead of this, the reflux passages 18 may be provided such that the discharged pressurized air discharged from one of the tilting mechanisms 20 and the discharged pressurized air discharged from the other tilting mechanism 20 are combined in advance and then introduced to the exhaust tank 9.

One main tank 6 is provided for one car. In the example of FIG. 1, the air supply passages 7 are provided so as to supply the pressurized air to the respective tilting mechanisms 20. Instead of this, the main tank 6 may include one port through which the pressurized air is supplied to the tilting mechanisms 20, and the air supply passage 7 may branch so as to be able to supply the pressurized air to the tilting mechanisms 20.

The car-body tilting system 5 includes a control portion 10 configured to perform opening degree control of the adjusting valves 14 and 16, switching control of the switching valves 24, and the like. In addition, the control portion 10 may perform on/off control of the plurality of compressors 11 and 12. To be specific, the control portion 10 serves as a second compressor control portion 10a configured to perform operation control of the second compressor 12. The control portion 10 is constituted by, for example, a microcontroller including a RAM, a ROM, and the like.

In FIG. 1, signal wires extending from the control portion 10 to respective signal transmission/reception targets of the tilting mechanism 20 located at a paper surface left side (one car longitudinal direction side) are shown by broken lines, and signal wires extending from the control portion 10 to respective signal transmission/reception targets of the tilting mechanism 20 located at a paper surface right side (the other car longitudinal direction side) are partially omitted.

The main tank 6 is provided with a main tank internal pressure detector 21 configured to detect pressure P6 of the pressurized air in the main tank 6 (i.e., internal pressure of the main tank 6). Information regarding the internal pressure detected by the main tank internal pressure detector 21 is transmitted to the control portion 10. The pressurized air stored in the main tank 6 is supplied to not only the air springs 4 and but also a brake device, a door driving device, a horn device (which are not shown), and the like of the railcar 1 as driving force. Therefore, even when the pressurized air in the main tank 6 is not utilized by the car-body tilting system 5 (air springs 4), the pressurized air in the main tank 6 may be supplied to and consumed by other devices. Therefore, the control portion 10 controls the plurality of compressors 11 and 12 such that the internal pressure P6 of the main tank 6 is maintained at predetermined pressure or more.

When performing a carbody inclination controlling operation, the control portion 10 switches the switching valve 24 such that the pressurized air in the main tank 6 is supplied through the pair of air supply passages 13 to the pair of air springs 4. When not performing the carbody inclination controlling operation (at the normal time), the control portion 10 switches the switching valve 24 such that the pressurized air in the main tank 6 is supplied through the normal-time air supply passages 23 to the pair of air springs 4.

The pair of air springs 4 are provided with a pair of air spring internal pressure detectors 22 each configured to detect internal pressure P4 of the corresponding air spring 4. Information regarding the internal pressure detected by the air spring internal pressure detector 22 is transmitted to the control portion 10. The air springs 4 are provided with respective automatic level controlling valves (leveling valves) 29 each configured to adjust the height of the corresponding air spring by automatically supplying or discharging the pressurized air to or from the corresponding air spring through the corresponding normal-time air supply passage 23. Further, the air springs 4 are provided with respective air spring height sensors 30 each configured to measure an overall height (air spring height) of the corresponding air spring 4. When not performing the carbody inclination controlling operation, the control portion 10 controls the switching valve 24 to realize communication of the main tank 6 with the air supply passages 13 as passages through which the pressurized air flows, and the control portion 10 operates the automatic level controlling valves 29. Thus, the air spring heights (car height) are maintained constant.

When performing the carbody inclination controlling operation, the opening degrees of the air supply adjusting valves 14 are independently adjusted by command signals from the control portion 10. Thus, the flow rate of the pressurized air flowing through each air supply passage 13 is adjusted. Similarly, the opening degrees of the air discharge adjusting valves 16 are independently adjusted by command signals from the control portion 10. Thus, the flow rate of the discharged pressurized air flowing through each exhaust passage 15 is adjusted.

For example, the control portion 10 obtains a curvature and cant amount of a track at a car existence position by comparing external information, detected by an own position detecting device (not shown), with a permanent way curved line data base (not shown). Then, the control portion 10 calculates a necessary carbody tilt command angle based on the curvature and the cant amount. Based on this carbody tilt command angle, the control portion 10 sets a target value of the overall height of the air spring 4 located at the outer rail side. Then, the control portion 10 compares the target value of the overall height with a measured value of the air spring height, the measured value being measured by the air spring height sensor 30 during tilting of the carbody. Based on the result of this comparison, the control portion 10 calculates a valve opening amount of the air supply adjusting valve 14 and then outputs a command signal indicating the valve opening amount of the air supply adjusting valve 14.

The own position detecting device calculates an own position based on: a travel distance obtained by accumulating values each obtained by multiplying a wheel revolution speed by a wheel diameter, the wheel revolution speed being obtained by, for example, a rotary encoder; and an accumulated travel distance obtained based on positions of ground elements of an ATS (automatic train stop device) and an ATC (automatic train control device) provided in the vicinity of the track.

For example, when the railcar travels through a left curved line, the control portion 10 compares the target value of the air spring height with the measured value of the air spring height sensor 30. With this, the air supply adjusting valve 14 for the left air spring 4 and both the air discharge adjusting valves 16 are maintained in a valve-closed state, and the air supply adjusting valve 14 for the right air spring 4 is opened. Thus, the overall height of the air spring 4 located at the outer rail side (right side) when the railcar travels through the curved line is increased in accordance with the turning curvature, the cant amount, and a traveling speed. With this, the carbody 2 is finally tilted at 1 to 2° with respect to the bogie frame 3. Thus, a component, parallel to a carbody floor surface, of the centrifugal force applied to the railcar 1 is reduced, and a component, perpendicular to the carbody floor surface, of the force applied to the railcar 1 is increased. When terminating the carbody inclination controlling operation, the air discharge adjusting valve 16 for the air spring 4 which is increased in the overall height is opened. Thus, the height of this corresponding air spring 4 is adjusted to become the height at the normal time. The exhaust tank 9 is provided with a tank exhaust passage 26 extending from the exhaust tank 9 to an outside. An air release exhaust valve 27 is interposed at the tank exhaust passage 26. When internal pressure P9 of the exhaust tank 9 is higher than a predetermined threshold, the air release exhaust valve 27 is opened to open the exhaust tank 9 to the atmosphere. The threshold at which the air release exhaust valve 27 is opened is set to a value lower than a lowest value assumed for the internal pressure P4 of the air spring 4. For example, a mechanical relief valve is adopted as the air release exhaust valve 27. By maintaining a state where the internal pressure P4 of the air spring 4 is higher than the internal pressure P9 of the exhaust tank 9, the discharged pressurized air discharged from the air spring 4 can smoothly flow to the exhaust tank 9.

The control portion 10 performs a control operation of causing the second compressor 12 to operate auxiliarily for the operation of the first compressor 11.

According to the above configuration, the second compressor 12 configured to introduce the discharged pressurized air is provided separately from the first compressor 11 configured to introduce the atmosphere, and in a section where the carbody tilting operation needs to be continuously performed, the second compressor 12 operates auxiliarily. Therefore, even when the second compressor 12 is operating, the first compressor 11 can independently introduce the atmosphere. On this account, even when the internal pressure of the main tank 6 lowers, it is unnecessary to stop the operation of the second compressor 12, and a highly efficient state can be maintained.

Even when the second compressor 12 breaks, the first compressor 11 can continuously operate. Therefore, a possibility of stopping the railcar 1 can be reduced.

By lowering an operation rate of the second compressor 12, continuous heat generation of the second compressor 12 can be prevented. Thus, the life of the second compressor 12 can be lengthened.

In the present embodiment, the exhaust tank 9 is provided with an exhaust tank internal pressure detector 25 configured to detect pressure P9 of the discharged pressurized air in the exhaust tank 9 (i.e., internal pressure of the exhaust tank 9). Information regarding the internal pressure detected by the exhaust tank internal pressure detector 25 is transmitted to the control portion 10.

To cause the second compressor 12 to operate auxiliarily for the first compressor 11, the control portion 10 (second compressor control portion 10a) performs a control operation of stopping the operation of the second compressor 12 such that the internal pressure P9 of the exhaust tank 9 is maintained at atmospheric pressure or more. According to this, the control portion 10 detects the internal pressure P9 of the exhaust tank 9 and stops the operation of the second compressor 12 before the detected internal pressure of the exhaust tank 9 becomes less than the atmospheric pressure (negative pressure). For example, when the second compressor 12 can operate according to the internal pressure P6 of the main tank 6, but the internal pressure P9 of the exhaust tank 9 will become the negative pressure by the operation of the second compressor 12, the second compressor 12 can operate but cannot operate efficiently. Therefore, to prevent the internal pressure P9 of the exhaust tank 9 from becoming the negative pressure, the control portion 10 performs the control operation of stopping the operation of the second compressor 12. Thus, the efficiency when using the second compressor 12 can be maintained high.

Figure 2:
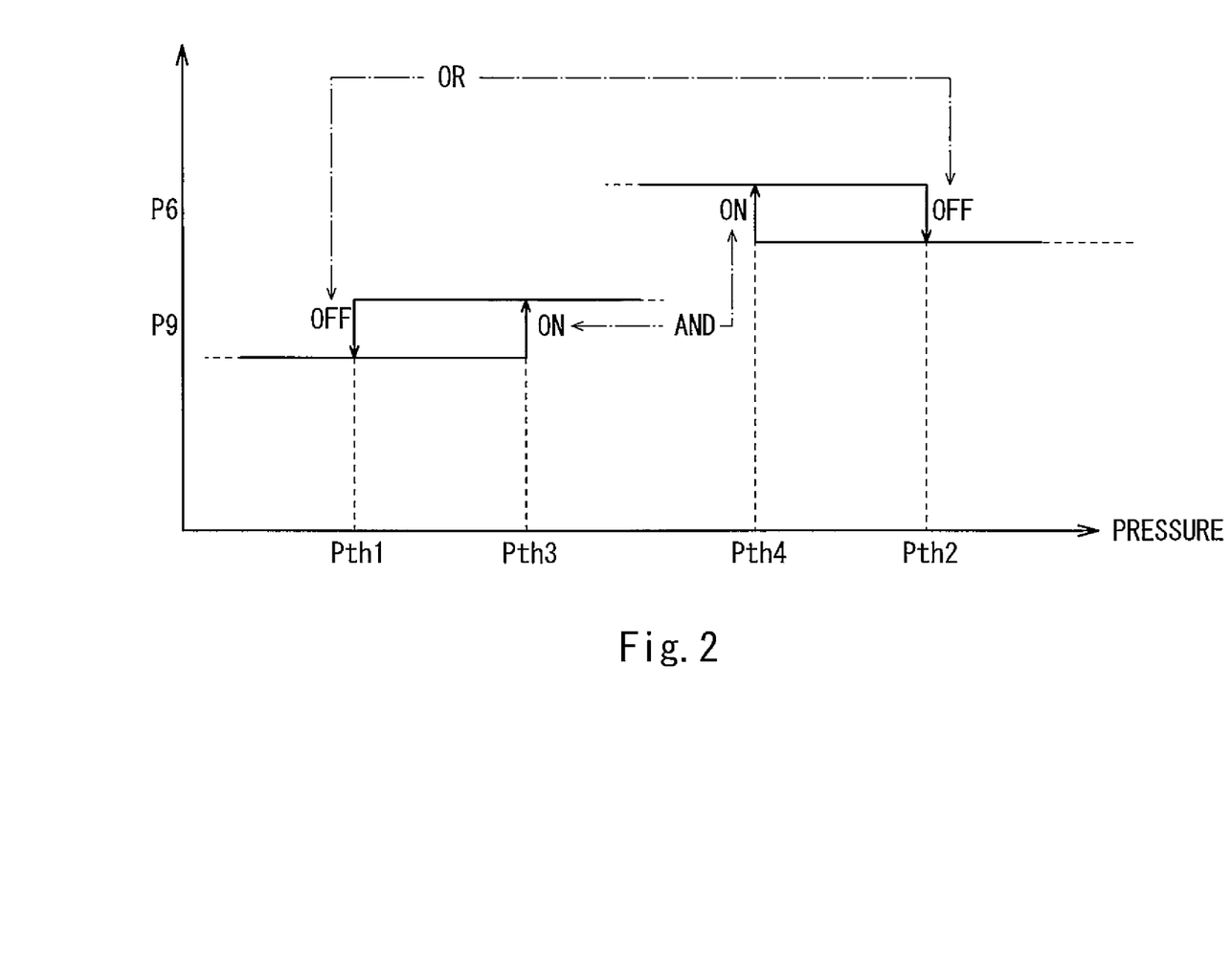
FIG. 2 is a graph showing an operating condition of a second compressor in Embodiment 1.

The operation control of the second compressor 12 will be explained more specifically. FIG. 2 is a graph showing an operating condition of the second compressor 12 in Embodiment 1. The control portion 10 stops the operation of the second compressor 12 when the internal pressure P9 of the exhaust tank 9 is lower than a first threshold Pth1 or when the internal pressure P6 of the main tank 6 is higher than a second threshold Pth2 higher than the first threshold Pth1 (P9<Pth1 or P6>Pth2). The first threshold Pth1 is set to such a value (for example, Pth1=25 KpaG) that the internal pressure P9 of the exhaust tank 9 does not become the negative pressure. The second threshold Pth2 is set to such a value (for example, Pth2=880 KpaG) that the internal pressure P6 of the main tank 6 does not become an upper limit.

On the other hand, the control portion 10 starts the operation of the second compressor 12 when the internal pressure P9 of the exhaust tank 9 is higher than a third threshold Pth3 higher than the first threshold Pth1, and the internal pressure P6 of the main tank 6 is lower than a fourth threshold Pth4 lower than the second threshold Pth2 (P9<Pth3 and P6>Pth4). The third threshold Pth3 is set to a value (for example, Pth3=50 KpaG) that is smaller than the first threshold Pth1 by a predetermined dead zone. The fourth threshold Pth4 is set to a value (for example, Pth4=780 KpaG) that is smaller than the second threshold Pth2 by a predetermined dead zone. As above, conditions of starting and stopping the operation of the second compressor 12 have hysteresis.

The operation of the first compressor 11 is controlled in accordance with the internal pressure P6 of the main tank 6. The control portion 10 stops the operation of the first compressor 11 when the internal pressure P6 of the main tank 6 is higher than the second threshold Pth2. The control portion 10 starts the operation of the first compressor when the internal pressure P6 of the main tank 6 is lower than the fourth threshold Pth4.

In this case, when the internal pressure P6 of the main tank 6 is lower than the fourth threshold Pth4, and the internal pressure P9 of the exhaust tank 9 is the third threshold Pth3 or less, the second compressor 12 does not operate, and only the first compressor 11 operates. To be specific, when the internal pressure P9 of the exhaust tank 9 is likely to become the negative pressure, the operation of the second compressor 12 becomes a stop state for suppressing lowering of the efficiency of the second compressor 12. When the carbody inclination controlling operation starts in a tilt section, the pressurized air is supplied to the air spring 4 by using only the first compressor 11. As a result, the discharged pressurized air discharged from the air spring 4 is filled in the exhaust tank 9, and the internal pressure P9 of the exhaust tank 9 increases. When the internal pressure P9 of the exhaust tank 9 becomes higher than the third threshold Pth3, the operating condition of the second compressor 12 is satisfied. Thus, the second compressor 12 can operate efficiently. Therefore, based on the amount of air filled in the exhaust tank 9 by the carbody inclination controlling operation performed once (i.e., based on an internal pressure increased value obtained by the amount of air filled in the exhaust tank 9 by the carbody inclination controlling operation performed once), the third threshold Pth3 is set to such a value that the internal pressure P9 of the exhaust tank 9 exceeds the third threshold Pth3 by the minimum number of times of the tilting of the carbody (for example, once).

When the internal pressure P6 of the main tank 6 is likely to become excessive (P6>Pth2), the control portion 10 stops the operation of the second compressor 12 for suppressing excessive load applied to the main tank 6 and other air pressure devices supplied with the air from the main tank 6.

As above, the control portion 10 starts the operation of the second compressor 12 when the internal pressure of the main tank 6 is not likely to become excessive, and the internal pressure of the exhaust tank 9 is high to some extent, and the discharged pressurized air can be discharged efficiently. Since the start and stop of the operation of the second compressor 12 are controlled by using such control logic, the second compressor 12 can be efficiently operated while lowering the operation rate of the second compressor 12.

The operating condition (P6<Pth4) of the second compressor 12 regarding the internal pressure P6 of the main tank 6 may be the same as the operating condition the first compressor 11 as above. However, the fourth threshold Pth4 may be a value smaller than the threshold in the operating condition of the first compressor 11. With this, the operation rate of the second compressor 12 can be lowered, and this can lengthen the life of the second compressor 12.

The present embodiment has explained a case where the control portion 10 configured to perform the opening degree control of the adjusting valves 14 and 16, the switching control of the switching valves 24, and the like serves as the second compressor control portion 10a configured to perform the operation control of the second compressor 12. However, the present embodiment is not limited to this. For example, in addition to the control portion 10, the car-body tilting system 5 may include another control portion (microcontroller or the like) configured to perform the operation control of the second compressor 12 or may include a logic circuit configured to perform the operation control of the second compressor 12.

Embodiment 2

Figure 3:
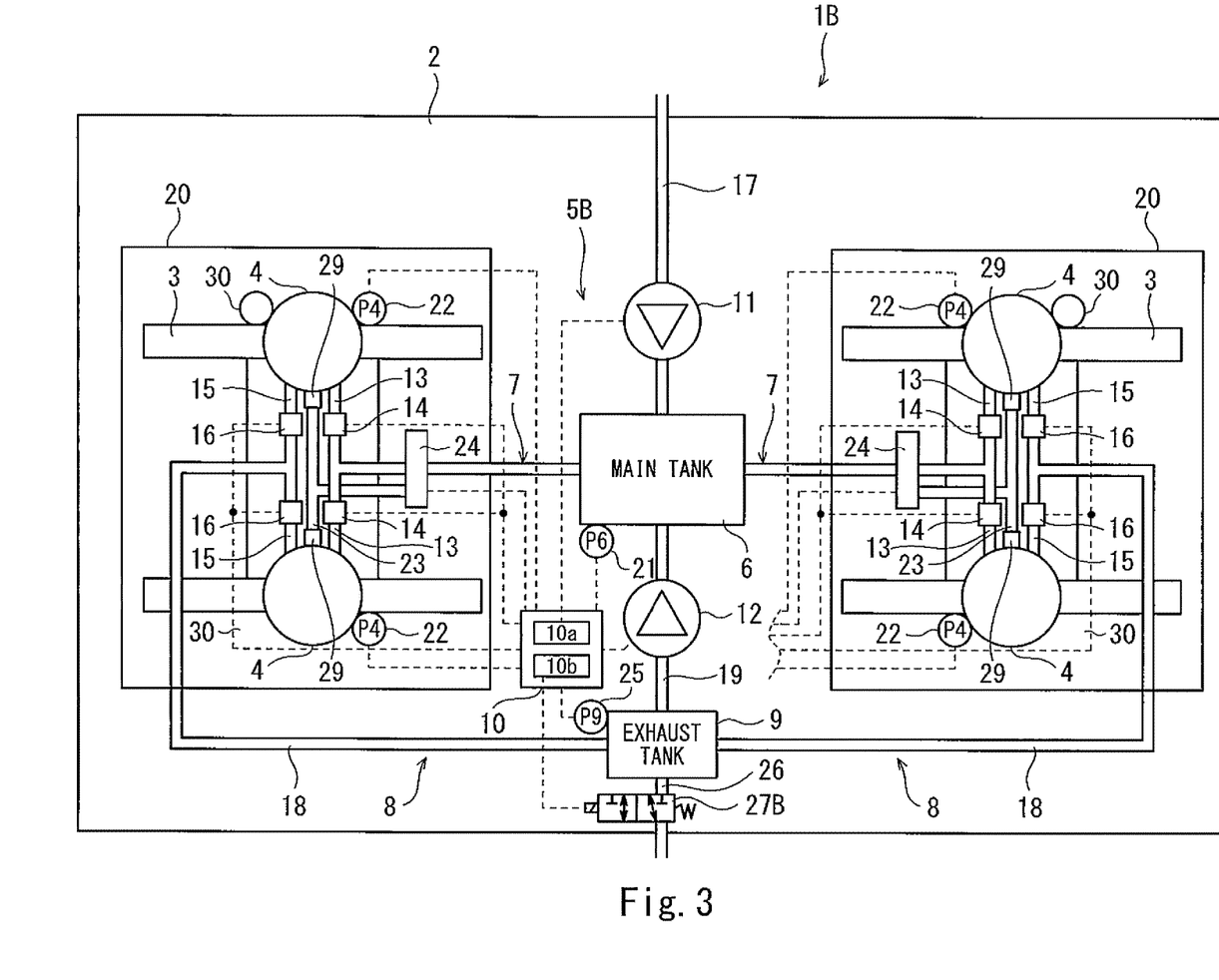
FIG. 3 is a plan view showing the schematic structure of the railcar in Embodiment 2.

FIG. 3 is a plan view showing a schematic structure of the railcar in Embodiment 2. In the present embodiment, the same reference signs are used for the same components as in Embodiment 1, and explanations of such components are omitted. As shown in FIG. 3, a car-body tilting system 5B of a railcar 1B in the present embodiment is different from Embodiment 1 in that an air release exhaust valve 27B configured to release the discharged pressurized air from the exhaust tank 9 to the atmosphere is constituted by a solenoid valve capable of changing relief pressure.

The control portion 10 serves as an exhaust valve the control portion 10b configured to perform the operation control of the air release exhaust valve 27B. When the internal pressure P9 of the exhaust tank 9 is higher than a fifth threshold Pth5 (Pth5>Pth3), the control portion 10 performs a control operation of opening the air release exhaust valve 27B to open the exhaust tank 9 to an outside. When the internal pressure P9 of the exhaust tank 9 is lower than a sixth threshold Pth6 lower than the fifth threshold Pth5, the control portion 10 performs a control operation of closing the air release exhaust valve 27B. To be specific, the operation control of the air release exhaust valve 27B also has hysteresis.

According to the present embodiment, as with Embodiment 1, by setting the internal pressure P9 of the exhaust tank 9 to the fifth threshold or less, the discharge of the pressurized air from the air spring 4 and the introduction of the pressurized air to the exhaust tank 9 can be prevented from being not performed.

Further, when the railcar 1 satisfies a predetermined condition, the control portion 10 changes the fifth threshold Pth5 and the sixth threshold Pth6 in accordance with the internal pressures P4 of the pair of air springs 4. More specifically, the control portion 10 changes the fifth threshold Pth5 and the sixth threshold Pth5 in accordance with the internal pressures P4 of the pair of air springs 4 when the internal pressures P4 detected by the air spring internal pressure detectors 22 are stable. Adopted as the internal pressure P4 of the air spring 4 is a lower one of the internal pressures P4 of the pair of air springs 4, the internal pressures P4 being detected by the respective air spring internal pressure detectors 22 at a predetermined position of a travel path of the railcar 1. It should be noted that an average value of the internal pressures P4 of the pair of air springs 4 may be adopted as the internal pressure P4 of the air spring 4 at the predetermined position.

When vehicle occupancy of the railcar 1 increases or decreases, the weight of the carbody 2 supported by the air springs 4 increases or decreases. In accordance with this, the internal pressures P4 of the air springs 4 increase or decrease. As described above, to cause the discharged pressurized air to smoothly flow from the air spring 4 to the exhaust tank 9, the internal pressure P9 of the exhaust tank 9 needs to be maintained lower than the internal pressure P4 of the air spring 4 (i.e., a state where such pressure gradient is generated needs to be maintained). However, to more efficiently supply the discharged pressurized air to the main tank 6 by using the second compressor 12, it is desirable that the internal pressure P9 of the exhaust tank 9 be as high as possible.

Therefore, the control portion 10 changes a valve opening condition (fifth threshold Pth5) of the air release exhaust valve 27B such that the internal pressure P9 of the exhaust tank 9 can be set to a value lower than the internal pressure P4 of the air spring 4 but be as high a value as possible. For example, a memory of the control portion 10 stores relational expressions regarding the internal pressure P4 of the air spring 4 at the predetermined position, the fifth threshold Pth5, and the sixth threshold Pth6. For example, the memory of the control portion 10 stores "Pth5=P4−A" and "Pth6=Pth5−B" (A and B are predetermined constants). After the control portion 10 acquires the internal pressures P4 of the air springs 4 at the predetermined position, the control portion 10 calculates the thresholds Pth5 and Pth6 based on the above relational expressions and sets the obtained values as the valve opening condition and valve closing condition of the air release exhaust valve 27B.

Instead of the relational expressions, the memory of the control portion 10 may store a storage table in which the thresholds Pth5 and Pth6 to be set based on the internal pressure P4 of the air spring 4 at the predetermined position are defined.

According to this configuration, even when the internal pressure of the air spring 4 changes in accordance with the vehicle occupancy, the upper limit of the internal pressure P9 of the exhaust tank 9 can be set close to the internal pressure P4 of the air spring 4, so that the amount of discharged pressurized air stored for the second compressor 12 can be set as large as possible (i.e., the internal pressure P9 of the exhaust tank 9 can be set as high as possible).

The present embodiment has explained a case where the control portion 10 configured to perform the opening degree control of the adjusting valves 14 and 16, the switching control of the switching valves 24, and the like serves as the exhaust valve control portion 10b configured to perform the operation control of the air release exhaust valve 27B. However, the present embodiment is not limited to this. For example, in addition to the control portion 10, the car-body tilting system 5B may include another control portion (microcontroller or the like) configured to perform the operation control of the air release exhaust valve 27B or may include a logic circuit configured to perform the operation control of the air release exhaust valve 27B.

The predetermined condition for changing the fifth threshold Pth5 and the sixth threshold Pth6 will be explained in more detail. For example, when a traveling speed V of the railcar 1 is a predetermined first speed or more as a first condition, the control portion 10 may determine that the railcar 1 satisfies the predetermined condition. The predetermined first speed in the present condition is set to a speed (for example, 5 km/h) close to a stop state, as a speed indicating a travel start state of the railcar 1. It should be noted that to prevent the generation of chattering, after the first condition is once satisfied, the control portion 10 determines that the condition is not satisfied unless the traveling speed V of the railcar 1 once becomes less than a speed (for example, 3 km/h) lower than the predetermined first speed. With this, for example, the departure of the railcar 1 from a stop station can be easily detected on the basis that the traveling speed V becomes the predetermined first speed or more from the stop state. Therefore, a state where the vehicle occupancy of the railcar 1 is relatively stable can be easily detected.

In addition to this or instead of this, for example, when a sensor (not shown) configured to detect opening and closing of a passenger entrance door of the railcar 1 detects the closing of the passenger entrance door as a second condition, the control portion 10 may determine that the railcar 1 satisfies the predetermined condition. With this, the state where the vehicle occupancy of the railcar 1 is relatively stable can be easily detected.

Further, for example, when the railcar 1 arrives at a prestored and predetermined stop station as a third condition, the control portion 10 may determine that the railcar 1 satisfies the predetermined condition. For example, the control portion 10 prestores stop stations where passengers may get on/off the railcar 1, and when the railcar 1 stops, the control portion 10 determines whether or not a stop position of the railcar 1 is the prestored stop station. For example, the control portion 10 receives stop station information at the time of the stop of the railcar 1 from a known car monitoring device (not shown) capable of recognizing the stop stations, and determines whether or not this stop station is the prestored and predetermined stop station. It should be noted that when the traveling speed V is zero, and the passenger entrance door is in an open state, the control portion 10 may determine that the railcar 1 has stopped.

The third condition can also be set as an AND condition together with the first condition and/or the second condition. To be specific, when the first condition and the third condition are satisfied, the control portion 10 may determine that the railcar 1 satisfies the predetermined condition. Further, when the second condition and the third condition are satisfied, the control portion 10 may determine that the railcar 1 satisfies the predetermined condition. Furthermore, when all of the first to third conditions are satisfied, the control portion 10 may determine that the railcar 1 satisfies the predetermined condition.

Further, for example, when the traveling speed V of the railcar 1 is a predetermined second speed or more, indicating a stable traveling state, as a fourth condition, the control portion 10 may determine that the railcar 1 satisfies the predetermined condition. The present condition may be especially applied to a train set formed by coupling a plurality of railcars 1 in which passengers can move. The predetermined second speed in the present condition is set to a relatively high speed (for example, 40 km/h) at which passengers hardly move in the plurality of railcars 1. It should be noted that to prevent the generation of the chattering, after the fourth condition is once satisfied, the control portion 10 determines that the condition is not satisfied unless the traveling speed V of the railcar 1 once becomes less than a speed lower than the predetermined second speed.

Further, in the case of adopting the fourth condition, the control portion 10 may be able to execute the carbody inclination controlling operation when the traveling speed V of the railcar 1 is a third speed (for example, 50 km/h) or more, the third speed being higher than the predetermined second speed. In this case, after the start of the traveling of the railcar 1 and before the start of the carbody inclination controlling operation, the fifth threshold Pth5 and the sixth threshold Pth6 for the internal pressure P9 of the exhaust tank 9 are surely updated. Therefore, the carbody inclination controlling operation can be performed in a state where the upper limit of the internal pressure P9 of the exhaust tank 9 is set in accordance with the actual internal pressure P4 of the air spring 4.

The fourth condition may further includes conditions that: the railcar 1 is traveling through a straight section; and the air spring height is within a predetermined range set based on a reference height. In this case, for example, the control portion 10 may include a known traveling section identifying portion (not shown) and be configured to identify whether the railcar 1 is traveling through a straight section or a curved section. By adding such conditions, the fifth threshold Pth5 and the sixth threshold Pth6 for the internal pressure P9 of the exhaust tank 9 can be set more appropriately.

The fourth condition can also be set as a condition combined with the first condition, the second condition, and/or the third condition. To be specific, the predetermined condition may include the fourth condition and any one of the first to third conditions. Or, the predetermined condition may include the fourth condition and any two of the first to third conditions. Or, the predetermined condition (AND condition) may include the first to fourth conditions.

Embodiment 3

Figure 4:
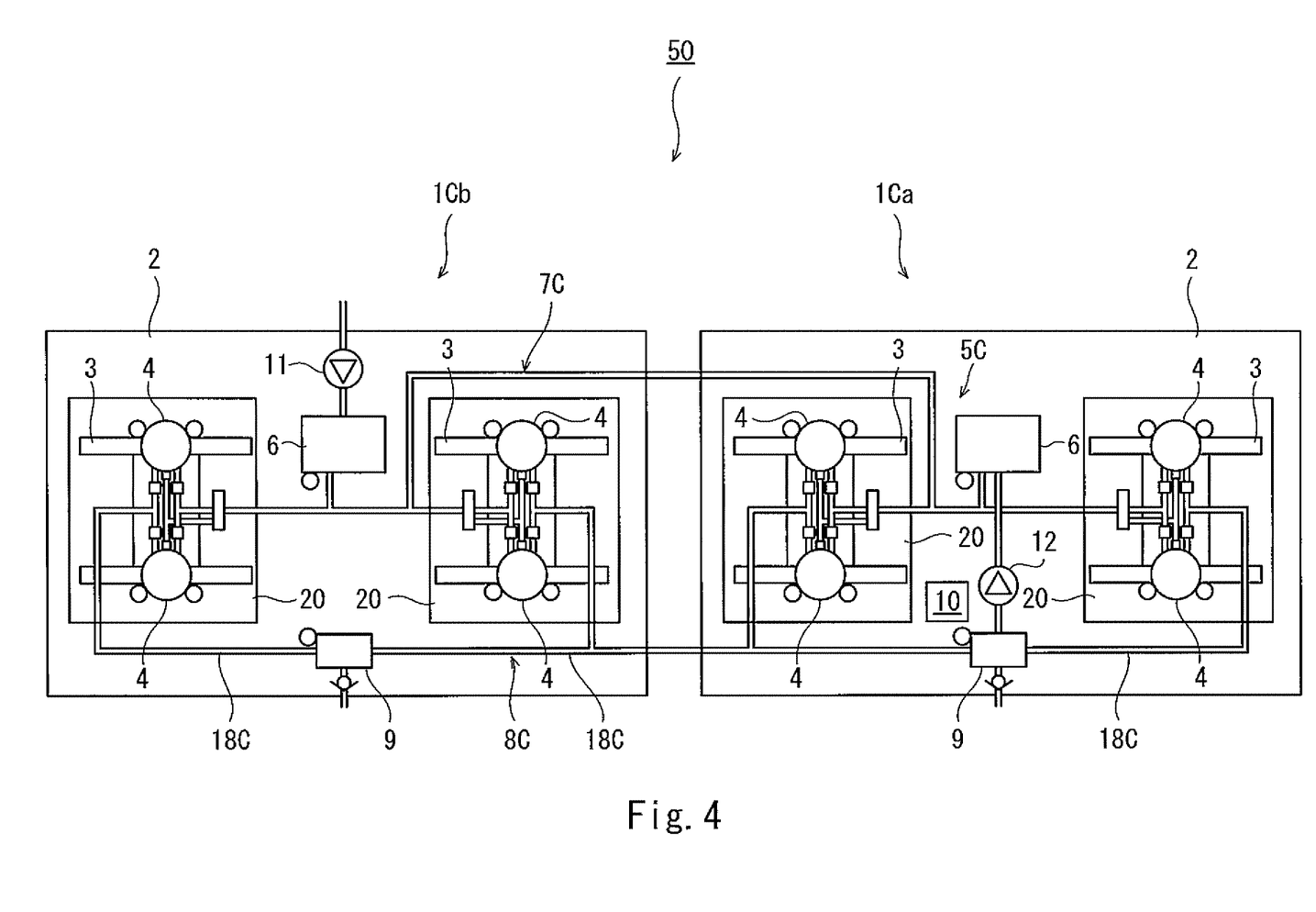
FIG. 4 is a plan view showing a schematic structure of a train set in Embodiment 3.

FIG. 4 is a plan view showing a schematic structure of the train set in Embodiment 3. In the present embodiment, the same reference signs are used for the same components as in Embodiment 1, and explanations of such components are omitted.

Each of Embodiments 1 and 2 explains a case where one railcar 1 includes the first compressor 11 and the second compressor 12. However, when applying Embodiment 1 or 2 to an existing railcar, i.e., to the configuration of PTL 1 or to a railcar including only a normal atmosphere introducing compressor (first compressor 11), it is difficult in some cases to add the second compressor 12 to the layout of the existing railcar in terms of space.

Therefore, the present embodiment will explain an example for providing a train set configured such that the car-body tilting system of the railcar which system is capable of efficiently supplying the discharged pressurized air even when the internal pressure of the main tank lowers can be relatively easily introduced to the existing railcar.

A train set 50 according to the present embodiment is configured such that: each of an air supply passage 7C and an air discharge passage 8C extends through two cars 1Ca and 1Cb; and one car-body tilting system 5C is formed for these two cars 1Ca and 1Cb. In the present embodiment, reflux passages 18C of the air discharge passage 8C extend through the two cars 1Ca and 1Cb, and each of the reflux passages 18C extends from the corresponding air spring 4 to the corresponding exhaust tank 9. Out of the two cars 1Ca and 1Cb, the first car 1Ca is provided with the second compressor 12, and the second car 1Cb is provided with the first compressor 11. In FIG. 4, signal wires extending from the control portion 10 are omitted. Although the control portion 10 is shown only in the first car 1Ca, the control portion 10 may be provided in each car. In FIG. 4, the air supply passage 7C and the air discharge passage 8C are provided at both respective car width direction end sides. However, both the air supply passage 7C and the air discharge passage 8C may be provided at one of both car width direction end sides or at a car width direction middle portion.

As above, in the train set 50 according to the present embodiment, a plurality of cars each including the conventional atmosphere introducing compressor are regarded as one unit, and the compressor of at least the first car out of the plurality of cars is replaced with the second compressor 12 configured to pressurize the discharged pressurized air introduced from the exhaust tank 9. With this, the first car does not have to have a space where the second compressor 12 is additionally provided. Thus, the car-body tilting system 5C can be relatively easily introduced to the existing car.

Further, space efficiency can be made higher than a case where both the first compressor 11 and the second compressor 12 are provided in the first car.

It should be noted that one main tank 6 is provided in each of the cars 1Ca and 1Cb. Further, one exhaust tank 9 is also provided in each of the cars 1Ca and 1Cb.

Since the exhaust tanks 9 are provided in the respective cars 1Ca and 1Cb, the length of the air discharge passage 8C connected between the air springs 4 and the exhaust tanks 9 can be made short (the lengths of the reflux passages 18C are made equal to one another), and a deviation of air discharge rates of the plurality of air springs 4 (i.e., a deviation of pressure gradients) can be prevented. Therefore, the inner diameter of the air discharge passage 8C (the inner diameters of the reflux passages 18C) can be made further smaller than the inner diameter of the air supply passage 7C. This can reduce a space for providing the air supply passage 7C and the air discharge passage 8C (reflux passages 18C) extending between the plurality of cars 1Ca and 1Cb.

In addition to or instead of the providing of the exhaust tanks 9 in the respective cars 1Ca 1Cb, the inner diameter of the air discharge passage 8C between each air spring 4 and the exhaust tank 9 may be increased. In this case, even when the distance between each air spring 4 and the exhaust tank 9 is long (i.e., even when the distances each between each air spring 4 and the exhaust tank 9 are different from one another), the deviation of the air discharge rates of the plurality of air springs 4 can be suppressed. Therefore, in this case, the exhaust tanks 9 do not necessarily have to be provided in the respective cars 1Ca and 1Cb.

The present embodiment has explained a case where the train set includes two cars. However, the present embodiment is not limited to this. The two cars in the present embodiment may be regarded as one unit, and the train set may include a plurality of such units.

Embodiment 4

Figure 5:
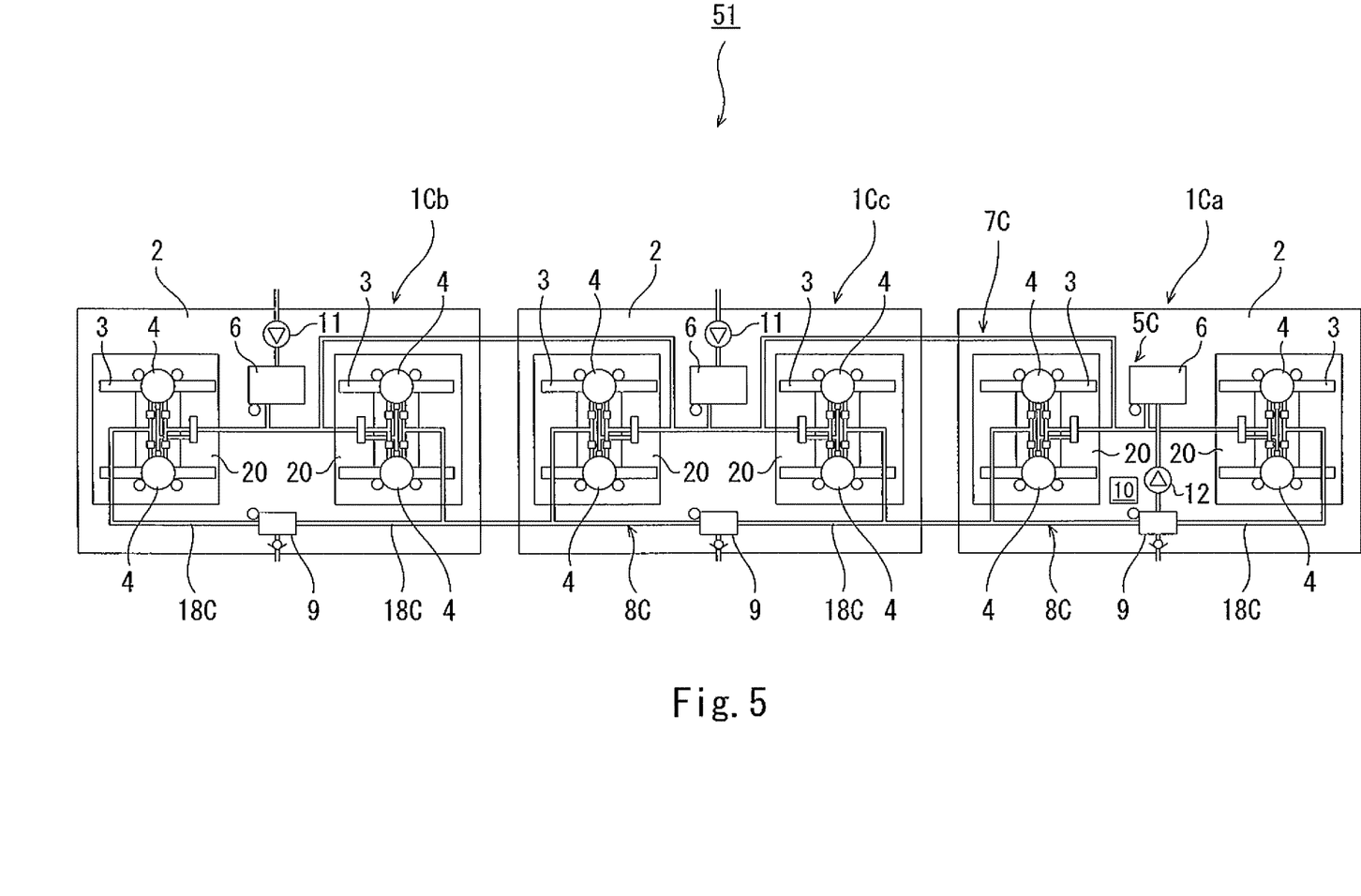
FIG. 5 is a plan view showing the schematic structure of the train set in Embodiment 4.

FIG. 5 is a plan view showing a schematic structure of the train set in Embodiment 4. In the present embodiment, the same reference signs are used for the same components as in Embodiment 3, and explanations of such components are omitted. A train set 51 of the present embodiment is configured such that one car-body tilting system 5C is formed for three cars 1Ca, 1Cb, and 1Cc. Therefore, the air supply passage 7C and the air discharge passage 8C extend from the intermediate car 1Cc to the adjacent cars 1Ca and 1Cb. Out of these three cars 1Ca, 1Cb, and 1Cc, the first car 1Ca is provided with the second compressor 12, and the cars 1Cb and 1Cc are provided with the respective first compressors 11.

As with the train set 50 including two cars in Embodiment 3, the train set 51 in the present embodiment has an effect in which the car-body tilting system 5C of the railcar which system is capable of efficiently supplying the discharged pressurized air even when the internal pressure of the main tank 6 lowers can be relatively easily introduced to the existing railcar.

The present embodiment has explained a case where the train set includes three cars. However, the present embodiment is not limited to this. The three cars in the present embodiment may be regarded as one unit, and the train set may include a plurality of such units.

It should be noted that at least the first car out of the plurality of cars is only required to be provided with the second compressor 12. Therefore, among a plurality of cars in which one car-body tilting system 5C is configured, the position of the car (a head car, an intermediate car, etc.) provided with the second compressor 12 is not limited.

Further, in a plurality of cars in which one car-body tilting system 5C is configured, a ratio of the number of second compressors 12 to the number of first compressors 11 can be suitably changed as long as at least one compressor is provided in each car. Further, one car-body tilting system may be configured for four or more cars. Also in this case, the ratio of the number of second compressors 12 to the number of first compressors 11 is not limited, and the positions of the cars in which the compressors 11 and 12 are provided are not limited.

The foregoing has explained the embodiments of the present invention. However, the present invention is not limited to the above embodiments, and various improvements, changes, and modifications may be made within the scope of the present invention. For example, the components in the above embodiments may be combined arbitrarily. For example, in each of FIG. 4 corresponding to Embodiment 3 and FIG. 5 corresponding to Embodiment 4, the air release exhaust valve 27 configured to release the discharged pressurized air from the exhaust tank 9 to the atmosphere is shown as the mechanical relief valve explained in Embodiment 1. However, the air release exhaust valve 27 may be configured as the solenoid valve capable of changing the relief pressure as in Embodiment 2.

Further, in the railcars 1 and 1B and the train sets 50 and 51 in each of which the car-body tilting system 5, 5B, or 5C of the above embodiment is provided, the railcar may be a bolsterless railcar or a bolster-equipped railcar as long as the pair of air springs 4 are used. Furthermore, in the railcars 1 and 1B and the train sets 50 and 51 in each of which the car-body tilting systems 5, 5B, or 5C of the above embodiment is provided, one bogie frame 3 may be provided for one car, and/or plural pairs of air springs 4 may be provided for one bogie frame 3.

Further, each of the above embodiments has explained an example in which two pairs of air springs 4 are provided for one car, and one exhaust tank 9 is provided for one car. However, the above embodiments are not limited to this, and one exhaust tank 9 may be provided for a pair of air springs 4.

Further, a train set may be configured such that one car-body tilting system is formed by a combination of a car(s) in which the first compressor 11 or the second compressor 12 is provided and a car(s) (car(s) in Embodiments 1 and 2) in which both the first compressor 11 and the second compressor 12 are provided.

The carbody inclination controlling operation itself is not especially limited. For example, the carbody inclination controlling operation may be performed based on a curvature and the like, the curvature and the like being calculated based on a detected value of an acceleration sensor or gyro sensor and a detected value of a speed sensor. Further, the own position, the curvature, and the like can be detected by a GPS.

It should be noted that the capacities of the main tanks 6 provided in the respective cars in Embodiments 3 and 4 may not be equal to one another. Especially, since the diameters of air pipes (MR straight pipes) extending among the main tanks 6 are relatively large, variations of the capacities of the main tanks are permissible. When the diameters of the MR straight pipes can be increased, the main tanks 6 may be collectively provided in a specific car(s) of the train set.

Similarly, in Embodiments 3 and 4, the exhaust tank 9 is provided in each car. However, the above embodiments are not limited to this. Due to the same reasons as above, when the diameters of the air pipes extending among the exhaust tanks 9 can be increased, the exhaust tanks 9 may be collectively provided in a specific car(s) of the train set.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

INDUSTRIAL APPLICABILITY

The above embodiments are useful for efficiently supplying discharged pressurized air even when internal pressure of a main tank lowers in a railcar or a train set.

REFERENCE SIGNS LIST 1, 1B railcar
1Ca, 1Cb, 1Cc car
2 carbody
3 bogie frame
4 air spring
5, 5B, 5C car-body tilting system
6 main tank
7, 7C air supply passage
8, 8C air discharge passage
9 exhaust tank
10 control portion
10a second compressor control portion
10b exhaust valve control portion
11 first compressor
12 second compressor
21 main tank internal pressure detector
22 air spring internal pressure detector
25 exhaust tank internal pressure detector
26 tank exhaust passage
27, 27B air release exhaust valve
50, 51 train set

The invention claimed is:

1. A railcar comprising a car-body tilting system configured to tilt a carbody by supplying pressurized air to at least one of a pair of air springs provided between the carbody and a bogie frame so as to be located at both respective car width direction sides of the railcar,
the car-body tilting system including:
a main tank storing the pressurized air supplied to the pair of air springs;
an air supply passage through which the pressurized air flows between the main tank and each of the pair of air springs;
a plurality of compressors configured to supply the pressurized air to the main tank;
an air discharge passage which is connected to the pair of air springs and through which discharged pressurized air discharged from the air springs flows; and
an exhaust tank connected to the air discharge passage and storing the discharged pressurized air discharged from the air springs,
the plurality of compressors including
at least one first compressor configured to pressurize air introduced from an atmosphere and
at least one second compressor configured to operate auxiliarily for an operation of the first compressor and pressurize the discharged pressurized air introduced from the exhaust tank.

2. The railcar according to claim 1, wherein:
the car-body tilting system includes
an exhaust tank internal pressure detector configured to detect internal pressure of the exhaust tank and
a second compressor control portion configured to perform operation control of the second compressor; and
the second compressor control portion performs a control operation of stopping an operation of the second compressor such that the internal pressure of the exhaust tank is maintained at atmospheric pressure or more.

3. The railcar according to claim 2, wherein:
the car-body tilting system includes a main tank internal pressure detector configured to detect internal pressure of the main tank;
when the internal pressure of the exhaust tank is lower than a first threshold or when the internal pressure of the main tank is higher than a second threshold higher than the first threshold, the second compressor control portion stops the operation of the second compressor; and
when the internal pressure of the exhaust tank is higher than a third threshold higher than the first threshold, and the internal pressure of the main tank is lower than a fourth threshold lower than the second threshold, the second compressor control portion starts the operation of the second compressor.

4. The railcar according to claim 1, wherein:
the car-body tilting system includes
a tank exhaust passage extending from the exhaust tank to an outside,
an air release exhaust valve interposed at the tank exhaust passage,
an exhaust tank internal pressure detector configured to detect internal pressure of the exhaust tank, and
an exhaust valve control portion configured to perform operation control of the air release exhaust valve; and
when the internal pressure of the exhaust tank is higher than a fifth threshold, the exhaust valve control portion performs a control operation of opening the air release exhaust valve to open the exhaust tank to the outside.

5. The railcar according to claim 4, wherein:
the car-body tilting system includes a pair of air spring internal pressure detectors configured to detect respective internal pressures of the pair of air springs; and
the exhaust valve control portion changes the fifth threshold in accordance with the internal pressures of the pair of air springs when the internal pressures detected by the air spring internal pressure detectors are stable.

6. A train set comprising car-body tilting systems and formed by coupling two or more cars,
each of the two or more cars including
a pair of air springs provided between a carbody and a bogie frame so as to be located at both respective car width direction sides of the car,
a main tank storing pressurized air supplied to the pair of air springs,
the car-body tilting system configured to tilt the carbody by supplying the pressurized air to at least one of the pair of air springs,
an air supply passage through which the pressurized air flows between the main tank and each of the pair of air springs,
an air discharge passage which is connected to the pair of air springs and through which discharged pressurized air discharged from the air springs flows, and an exhaust tank connected to the air discharge passage and storing the discharged pressurized air discharged from the air springs, at least one of the two or more cars including
  a second compressor configured to pressurize the discharged pressurized air introduced from the exhaust tank through a reflux passage, another car out of the two or more cars including
  at least one first compressor configured to pressurize air introduced from an atmosphere.

* * * * *